United States Patent [19]
Shin et al.

[11] Patent Number: 6,058,432
[45] Date of Patent: May 2, 2000

[54] NETWORK SPLITTER MODULE

[75] Inventors: Seong S. Shin, Cupertino; Manpo Kwong, San Jose, both of Calif.

[73] Assignee: Texas Instruments Incorporated, Dallas, Tex.

[21] Appl. No.: 09/027,855

[22] Filed: Feb. 23, 1998

[51] Int. Cl.$^7$ ........................................ G06F 13/00
[52] U.S. Cl. ............................................. 709/249
[58] Field of Search ..................... 364/DIG. 1, DIG. 2; 710/69; 709/200, 217, 218, 223, 225, 249, 250

[56] References Cited

U.S. PATENT DOCUMENTS 5,931,929  8/1999  Tran et al. ................... 710/69

*Primary Examiner*—Robert B. Harrell
*Attorney, Agent, or Firm*—Ronald O. Neerings; Richard L. Donaldson

[57] ABSTRACT

A computer system includes a mobile electronic device (30) which can be coupled to a network (18) either directly or through a receiving station (32) such as a docking station or a port replicator. A splitter module (36) is coupled to network connectors (14a and 14b) on both the mobile electronic device (30) and on the receiving station (32) to communicate with either network connector (14a or 14b).

19 Claims, 2 Drawing Sheets

NETWORK SPLITTER MODULE

BACKGROUND OF THE INVENTION

1. Technical Field

This invention relates in general to computers, and, more particularly, to computer networking.

2. Description of the Related Art

Since the proliferation of the personal computer as a personal and business tool, portable computers have been in high demand. Portable computer manufacturers are continually refining the portable computers to have a greater number of features while reducing the size and weight of the units. Current day portable computers have processing power equivalent to typical desktop machines.

Very low weight portable computers are referred to as "notebook" computers. At one time, notebook computers were stripped of many features in order to reduce weight and size; however, current day notebook computers are full-featured. Weight and size are among the most important factors in selecting a notebook computer. Since a notebook computer is meant to be used in many different locations, the ease with which it can be carried is often determinative of its value. Accordingly, notebook computers differ from desktop computers with respect to the keyboard size and the monitor size.

In order to provide full features to a notebook computer while the computer is in the office environment, most notebook manufacturers provide optional docking stations or port replicators, which allow the user to connect the notebook computer to a full size monitor and keyboard by slipping the notebook into an external unit on the user's desk. If the office is networked, the docking station or port replicator may also include a network connection.

FIGS. 1a and 1b illustrate a typical connection between a network interface card and a network. A network interface circuit 10 is coupled to a isolation transformer 12. The isolation transformer 12 is coupled to a connector 14, typically, a RJ45 connector, although other connectors could be used as well. A cable 16 is coupled between the connector 14 and the network 18.

FIG. 1b illustrates a schematic diagram of the isolation transformer 12. The network interface side of the isolation transformer 12 has two windings, a transmit primary winding 20 and a receive primary winding 22. The connector side of the isolation transformer 12 also has two windings, a transmit secondary winding 24 and a receive secondary winding 26. For an RJ45 connector, the transmit secondary winding 24 is coupled to pins "1" and "2" of the connector and the receive secondary winding 26 is coupled to pins "3" and "6" of the connector.

The isolation transformer 12 isolates the network circuitry 10 from DC voltages which could corrupt the network signals. These voltage would include signals from noisy electrical system grounds, ground loops, power line spikes and other power line disruptions.

However, isolation transformers do not contemplate multiple connectors being coupled to the network circuitry. Because both the portable computer and the docking station may have separate connectors which may be used to connect to the network, this presents a significant problem.

Therefore, a need has arisen for a method an apparatus for connecting multiple network connectors in a computer system to a single network interface circuit.

BRIEF SUMMARY OF THE INVENTION

In the present invention, a computer system comprises a mobile electronic device including processing electronics, network communication circuitry coupled to the processing electronics, and a first network connector. A receiving station receives the mobile electronic device and has a second network connector. A splitter module coupled to said first and second network connectors transmits and receives signals between either of the connectors and the network communication circuitry.

The present invention provides significant advantages over the prior art. The splitter module allows multiple network connectors to be coupled to a single network interface circuit.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1A:
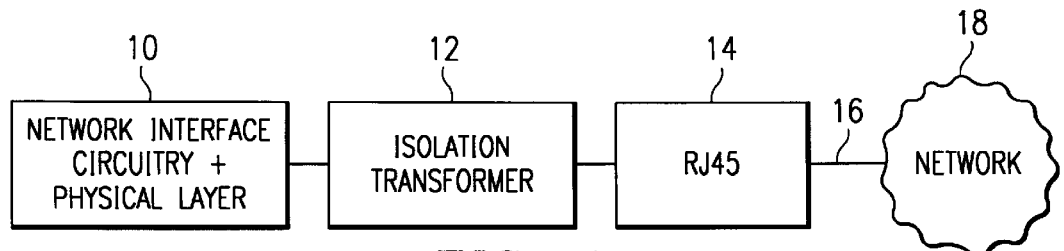
FIG. 1a illustrates a prior art connection between a network interface circuit and a network.
Figure 1B:
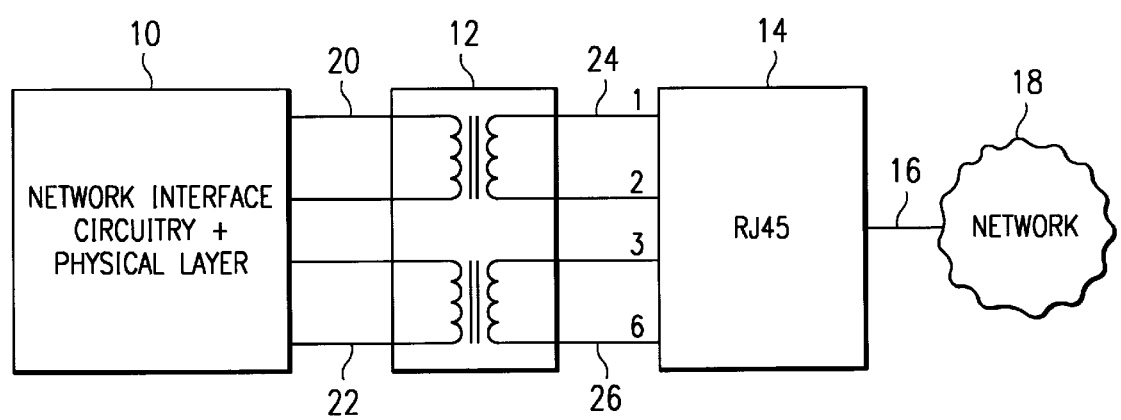
FIG. 1b illustrates a prior art isolation transformer.
Figure 2:
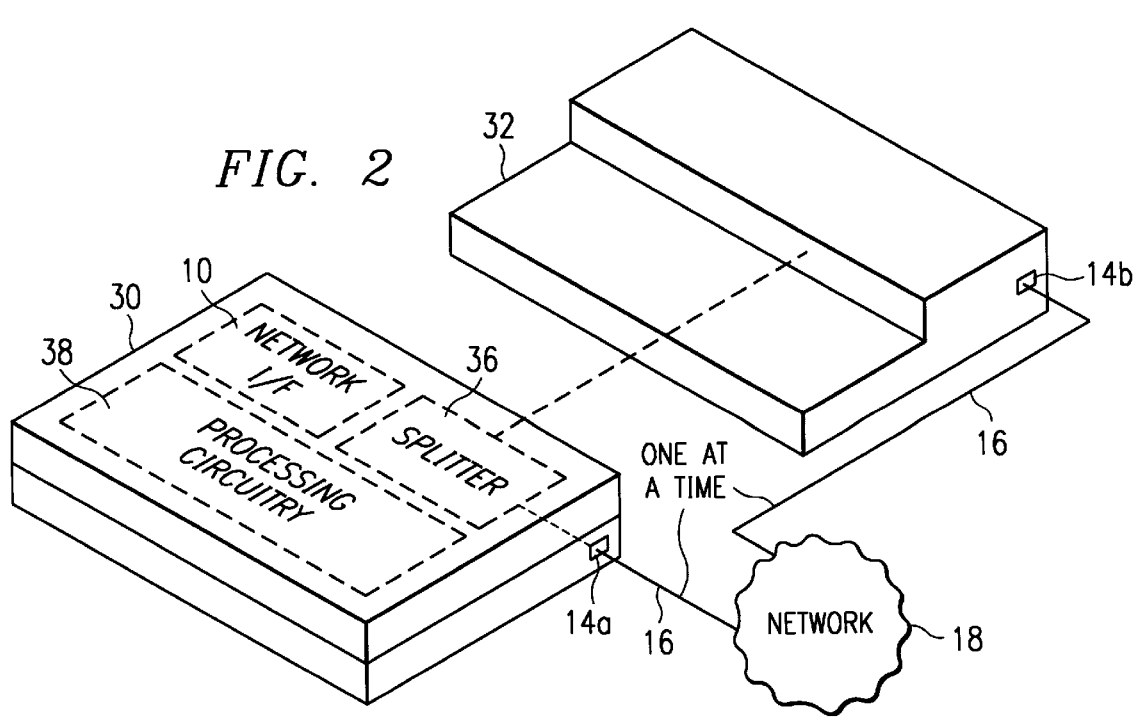
FIG. 2 illustrates a mobile computing device which can be coupled to a network directly or through a docking station.
Figure 3:
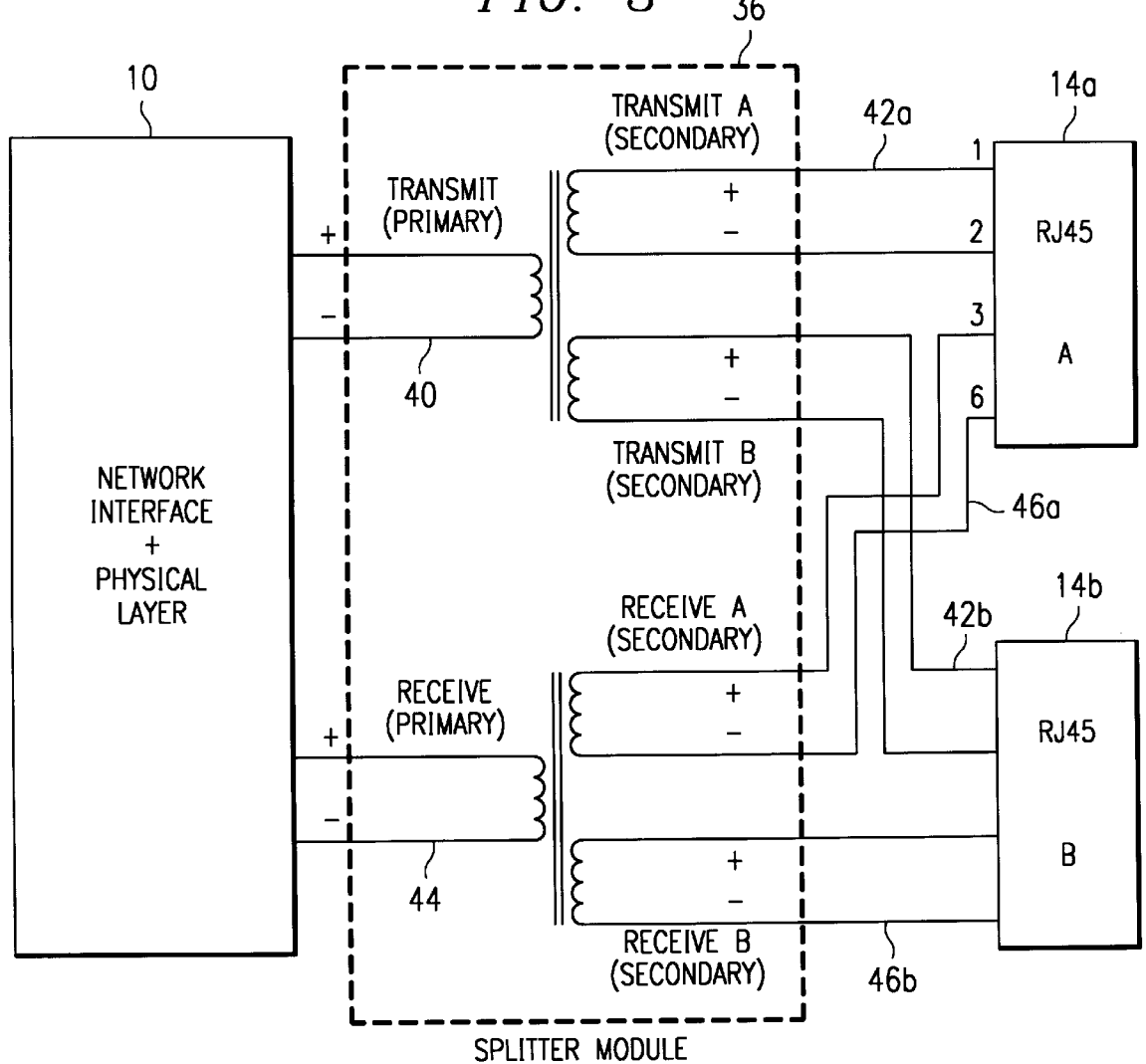
FIG. 3 illustrates a splitter module used to connect a network interface circuit to multiple network connectors.

The present invention is best understood in relation to FIGS. 2–3 of the drawings, like numerals being used for like elements of the various drawings.

FIG. 2 illustrates a perspective view of a mobile electronic device 30 and a receiving station 32. The mobile electronic device is typically a portable computer, but could also be a personal digital assistant, graphing calculator or other device. The receiving station 32 is a docking station, port replicator or other device which can be connected to the mobile electronic device 30 to provide connections to other devices, such as the network 18, keyboard and monitor. When the mobile electronic device 30 is connected to the receiving station, contacts (not shown) on the mobile electronic device 30 and the receiving station 32 mate to provide an electrical connection between the two units.

The mobile electronic device 30 has a network connector 14a, typically an RJ 45 connector. Similarly, the receiving station 32 has a network connector 14b. The mobile electronic device 30 includes a network interface 10. Typically, the network interface 10 is an Ethernet network interface. A splitter circuit 36 couples the network interface 10 to the network connectors 14a and 14b. Processing circuitry is coupled to the network interface. Processing circuitry would include, for example, the processor, video/graphics controller, memory and non-volatile storage.

During operation, the user may connect the mobile electronic device to the network 18 either directly from the mobile electronic device 30 through connector 14a or via the receiving station through connector 14b. Typically, the connection will be made through the receiving station while the user is at his or her desk and will be made directly through connector 14a when the user is outside of the office, such as when the user is in a conference room or at a remote site.

The splitter circuit 36 allows communication between either connector 14a or 14b and the network interface circuit 10. At any one time, only one of the connectors 14a or 14b will have a physical connection to the network 18.

FIG. 3 illustrates a schematic of the splitter module 36 connected to the network interface 10 and to the network connectors 14a and 14b in an embodiment where the connectors are RJ45 connectors. The splitter module 36 includes a transmit primary winding 40 electromagnetically coupled to a first transmit secondary winding 42a and to a second transmit secondary winding 42b. The first transmit secondary winding 42a is coupled to pins "1" and "2" of the RJ45 connector 14a. The second transmit secondary winding 42b is coupled to pins "1" and "2" of the RJ45 connector 14b.

The splitter module 36 includes a receive primary winding 44 electromagnetically coupled to a first receive secondary winding 46a and to a second receive secondary winding 46b. The first receive secondary winding 46a is coupled to pins "3" and "6" of the RJ45 connector 14a. The second receive secondary winding 46b is coupled to pins "3" and "6" of the RJ45 connector 14b.

The wiring ratio of the primary to secondary windings is shown in Table I below.

| Primary (Interface side) | Secondary (Connector side) | Ratio |
| --- | --- | --- |
| Transmit (40) | Transmit A (42a) | 1:1 |
| Transmit (40) | Transmit B (42b) | 1:1 |
| Receive (44) | Receive A (46a) | 1:1 |
| Receive (44) | Receive B (46b) | 1:1 |

In operation, whichever windings (42a and 46a or 42b and 46b) are connected to the network 18 will communicate to the network interface 10 through primary windings 40 and 44. Thus, a single splitter module 36 can be used with multiple network connectors 14, without any configuration by the user. Further, the splitter module 36 can be used to transmit and receive data in both 10 Base T (10 Mbs) and 100 Base T (100 Mbs) formats.

While the splitter module is shown in an embodiment that connects to two network connectors 14, a splitter module to couple with three or more network connectors 14 could be designed by providing additional transmit and receive secondary windings.

The present invention provides significant advantages over the prior art. The splitter module allows multiple network connectors to be coupled to a single network interface circuit.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. A computer system comprising:
   a mobile electronic device comprising:
      processing electronics;
      network communication circuitry coupled to said processing electronics; and
      a first network connector;
   a receiving station for receiving said mobile electronic device, said receiving station having a second network connector; and
   a splitter module coupled to said first and second network connectors for transmitting and receiving signals between either of said connectors and said network communication circuitry.

2. The computer system of claim 1, wherein said first network connector is a RJ45 connector.

3. The computer system of claim 2, wherein said second network connector is a RJ45 connector.

4. The computer system of claim 1 wherein said splitter module comprises:
   a transmit primary;
   a receive primary;
   a first transmit secondary coupled to said first network connector and electromagnetically coupled to said transmit primary;
   a second transmit secondary coupled to said second network connector and electromagnetically coupled to said transmit primary;
   a first receive secondary coupled to said first network connector and electromagnetically coupled to said receive primary; and
   a second receive secondary coupled to said second network connector and electromagnetically coupled to said receive primary.

5. The computer system of claim 4 wherein said wiring ratio between said transmit primary and said first transmit secondary is 1:1 and said wiring ratio between said transmit primary and said second transmit secondary is 1:1.

6. The computer system of claim 4 wherein said wiring ratio between said receive primary and said first receive secondary is 1:1 and said wiring ratio between said receive primary and said second receive secondary is 1:1.

7. The computer system of claim 1 wherein said network communication circuitry is an Ethernet controller circuit.

8. The computer system of claim 1, wherein said mobile electronic device comprises a portable computer.

9. The computer system of claim 1 wherein said mobile electronic device comprises a personal digital assistant.

10. A circuit for connecting a mobile electronic device to a network, comprising:
    a first network connector for selectively coupling to the network by the user;
    a second network connector for selectively coupling to the network;
    a splitter module coupled to network communication circuitry associated with the mobile electronic device, said splitter module comprising:
       a transmit primary;
       a receive primary;
       a first transmit secondary coupled to said first network connector and electromagnetically coupled to said transmit primary;
       a second transmit secondary coupled to said second network connector and electromagnetically coupled to said transmit primary;
       a first receive secondary coupled to said first network connector and electromagnetically coupled to said receive primary; and
       a second receive secondary coupled to said second network connector and electromagnetically coupled to said receive primary.

11. The circuit of claim 10 wherein said first network connectors is integral to said mobile electronic device.

12. The circuit of claim 11 wherein said second network connector is integral to a receiving station for said mobile electronic device.

13. The circuit of claim 10 wherein said first and second connectors comprise RJ45 connectors.

14. The circuit of claim 10 said wiring ratio between said transmit primary and said first transmit secondary is 1:1 and said wiring ratio between said transmit primary and said second transmit secondary is 1:1.

15. The circuit of claim 10 said wiring ratio between said receive primary and said first receive secondary is 1:1 and said wiring ratio between said receive primary and said second receive secondary is 1:1.

16. The circuit of claim 10 wherein said network communication circuitry comprises Ethernet network communication circuitry.

17. A method of connecting a mobile electronic device to a network comprising the steps of:

connecting either a first network connector or a second network connector to the network;

electromagnetically coupling a transmit primary winding to a first transmit secondary winding coupled to said first network connector, if said first network connector is coupled to the network, where said transmit primary is coupled to network communication circuitry associated with the mobile electronic device;

electromagnetically coupling the transmit primary winding to a second transmit secondary winding coupled to said second network connector, if said second network connector is coupled to the network;

electromagnetically coupling a receive primary winding to a first receive secondary winding coupled to said first network connector, if said first network connector is coupled to the network, where said receive primary is coupled to network communication circuitry associated with the mobile electronic device;

electromagnetically coupling the receive primary winding to a second receive secondary winding coupled to said second network connector, if said second network connector is coupled to the network.

18. The method of claim 17 where said step of connecting a first or second network connector comprises the step of connecting either a first RJ45 network connector or a second RJ45 network connector to the network.

19. The method of claim 17 where said step of connecting a first or second network connector comprises the step of connecting either a first network connector integral to the mobile electronic device or a second network connector integral to a receiving station for the mobile electronic device to the network.

* * * * *